United States Patent
Dewald

(10) Patent No.: US 10,371,562 B2
(45) Date of Patent: Aug. 6, 2019

(54) STRAIN GAUGE SPAN BLOCK FOR A DRILLING RIG

(71) Applicant: Nabors Drilling Technologies USA, Inc., Houston, TX (US)

(72) Inventor: Brian Dale Dewald, Calgary (CA)

(73) Assignee: Nabors Drilling Technologies USA, Inc., Houston, TX (US)

( * ) Notice: Subject to any disclaimer, the term of this patent is extended or adjusted under 35 U.S.C. 154(b) by 69 days.

(21) Appl. No.: 14/802,257

(22) Filed: Jul. 17, 2015

(65) Prior Publication Data

US 2017/0016756 A1    Jan. 19, 2017

(51) Int. Cl.
| | |
|---|---|
| *E21B 3/02* | (2006.01) |
| *G01G 3/14* | (2006.01) |
| *G01L 1/18* | (2006.01) |
| *G01L 1/22* | (2006.01) |
| *G01L 1/24* | (2006.01) |
| *E21B 44/00* | (2006.01) |
| *E21B 47/00* | (2012.01) |
| *E21B 47/01* | (2012.01) |

(52) U.S. Cl.
CPC ............ *G01G 3/1402* (2013.01); *E21B 3/02* (2013.01); *E21B 44/00* (2013.01); *E21B 47/0006* (2013.01); *E21B 47/01* (2013.01); *G01L 1/18* (2013.01); *G01L 1/2243* (2013.01); *G01L 1/242* (2013.01)

(58) Field of Classification Search
CPC ... G01G 3/1402–3/1412; G01L 1/2206; G01L 1/048; G01L 1/22; G01L 1/2287; G01L 25/003; G01L 3/108; G01L 3/1457; E21B 3/02–3/06; E21B 47/0006; E21B 19/166; E21B 44/04

USPC ........ 73/152.49, 862.338, 862.627, 862.632, 73/862.633, 862.629; 338/5; 702/43; 33/DIG. 13; 177/211

See application file for complete search history.

(56) References Cited

U.S. PATENT DOCUMENTS

| | | | | |
|---|---|---|---|---|
| 3,782,182 | A * | 1/1974 | Starr ...................... | G01L 1/2206 338/2 |
| 3,864,966 | A * | 2/1975 | Seitz ...................... | G01L 1/2281 338/3 |

(Continued)

FOREIGN PATENT DOCUMENTS

JP    56117165 A  *  9/1981    ........... G01L 1/2206

OTHER PUBLICATIONS

Roark, Stress Concentration Chapter 6, provided by Rensselaer Polytechnic Institute on Jan. 24, 2013 at http://www.ewp.rpi.edu/hartford/~ernesto/Su2012/EP/MaterialsforStudents/Aiello/Roark-Ch06.pdf.*

(Continued)

*Primary Examiner* — Justin Seo
*Assistant Examiner* — David L Singer
(74) *Attorney, Agent, or Firm* — Enrique Abarca; Abel Schillinger, LLP

(57) ABSTRACT

A system includes a span block configured to couple with an extension from a top drive at a first end of the span block and configured to couple to a tubular at a second end of the span block. The system also includes a sensor block of the span block. The sensor block extends between the first end and the second end of the span block. Moreover, the sensor block is configured to provide an electronic indication of deformation of a portion of the sensor block in response to forces placed on the span block.

17 Claims, 5 Drawing Sheets

(56) References Cited

U.S. PATENT DOCUMENTS

| | | | | |
|---|---|---|---|---|
| 4,196,337 | A | * | 4/1980 | Jewett ................ G01L 3/1457 219/121.35 |
| 4,475,610 | A | * | 10/1984 | Schwarzschild ..... G01G 3/1402 177/211 |
| 4,576,053 | A | | 3/1986 | Hatamura |
| 5,144,298 | A | * | 9/1992 | Henneuse ........... E21B 47/0006 175/40 |
| 5,448,911 | A | | 9/1995 | Mason |
| 5,585,572 | A | * | 12/1996 | Kindler .................. G01L 3/108 73/782 |
| 5,734,110 | A | * | 3/1998 | Kosmal ................ G01L 1/2206 177/211 |
| 6,504,114 | B1 | * | 1/2003 | Lockery ............... G01L 1/2243 177/229 |
| 8,727,039 | B1 | | 5/2014 | Keast |
| 2004/0251059 | A1 | * | 12/2004 | Haggstrom .......... G01L 1/2218 177/211 |
| 2006/0124353 | A1 | * | 6/2006 | Juhasz ................... E21B 19/07 175/40 |
| 2007/0251701 | A1 | * | 11/2007 | Jahn ..................... E21B 19/166 166/379 |
| 2008/0202810 | A1 | | 8/2008 | Gomez |
| 2008/0264648 | A1 | * | 10/2008 | Pietras .................. E21B 19/16 166/380 |
| 2009/0151934 | A1 | * | 6/2009 | Heidecke .................. E21B 3/02 166/250.01 |
| 2011/0016964 | A1 | | 1/2011 | Strom |
| 2012/0160517 | A1 | * | 6/2012 | Bouligny ................. E21B 3/02 166/380 |
| 2012/0180574 | A1 | * | 7/2012 | Clegg .................. G01L 3/1457 73/862.621 |
| 2013/0056275 | A1 | * | 3/2013 | Neidhardt ................ E21B 3/02 175/57 |
| 2013/0239701 | A1 | * | 9/2013 | Huang ..................... G01L 1/22 73/862.045 |
| 2014/0298923 | A1 | * | 10/2014 | Geldman ............... G01L 1/2287 73/862.627 |

OTHER PUBLICATIONS

Instrumentation and Control Engineering, Bonded Strain Gauges, 2010, Blogspot.com.*

International Association of Drilling Contractors, Definition of Sub, 2017.*

Department of Health and Human Searvices, Glossary of Terms Used in the Oil and Gas Well Drilling Industry, 1984.*

PetroWiki, Glossary:Sub, Sep. 12, 2013.*

Schlumberger, Oilfield Glossary, 2017.*

Dictionary.com, Define Sub, 2017.*

PCT/US2016/039002 International Search Report and Written Opinion dated Sep. 28, 2016.

* cited by examiner

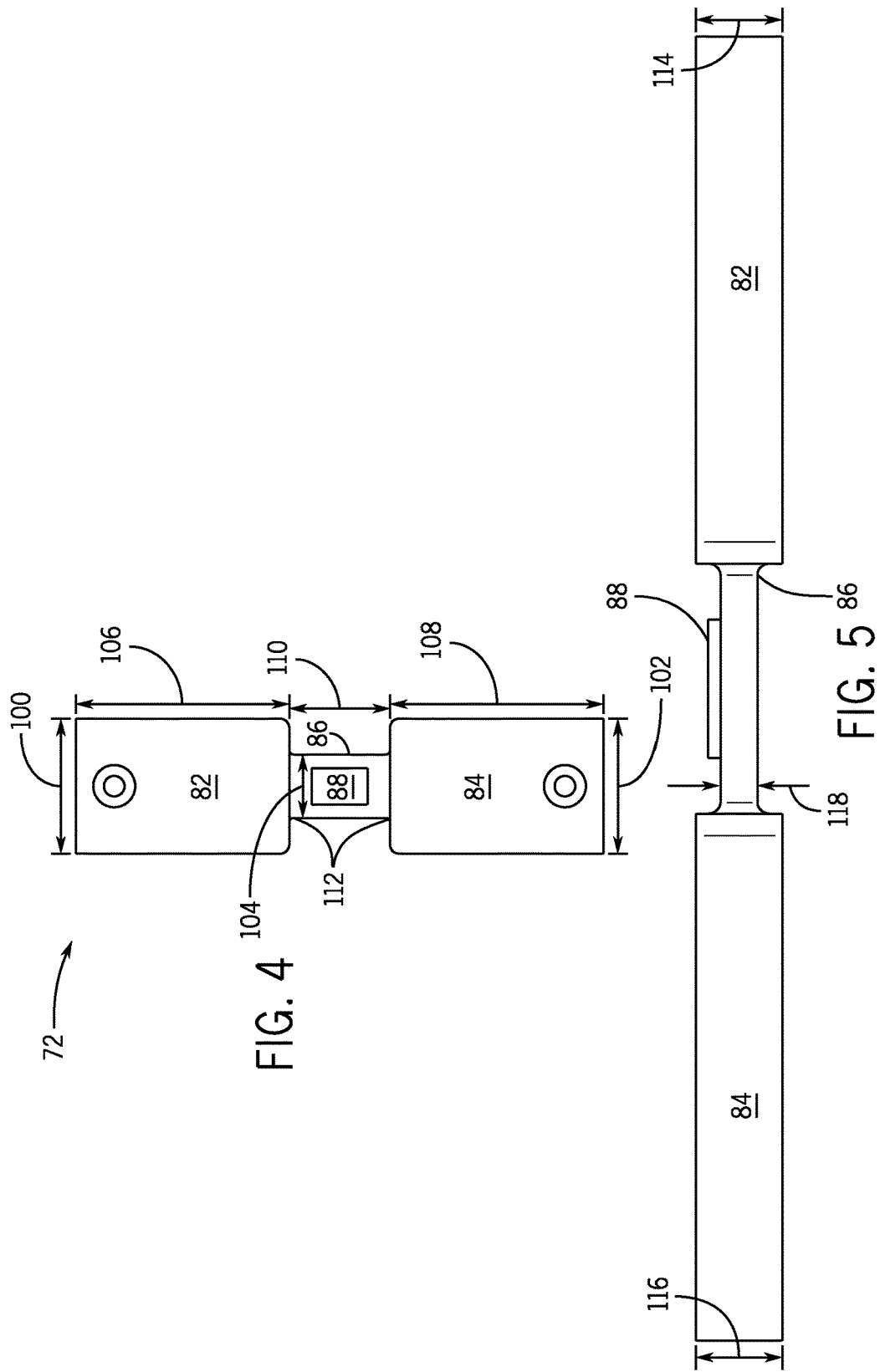

STRAIN GAUGE SPAN BLOCK FOR A DRILLING RIG

BACKGROUND

Embodiments of the present disclosure relate generally to the field of drilling and processing of wells. More particularly, present embodiments relate to a system for determining strain in drilling equipment.

Sensors are typically utilized during drilling operations to provide an indication of various conditions associated with the drilling operations. For example, in certain drilling operations, a top drive may couple to a wellbore tubular utilized to form a drill string in a wellbore and the top drive may include a sensor for measuring force (e.g., weight) applied to the top drive by the tubular. The additional weight of the wellbore tubular may alter the desired operating conditions of the top drive. For example, the top drive may be configured to apply a greater rotational force to the tubular depending on the weight of the tubular. Accordingly, it may be desirable to measure the force applied to the top drive to enable modification of drilling operations based on the force.

BRIEF DESCRIPTION

In an embodiment a system includes a span block configured to couple with an extension from a top drive at a first end of the span block and configured to couple to a tubular at a second end of the span block. The system also includes a sensor block of the span block. The sensor block extends between the first end and the second end of the span block. Moreover, the sensor block is configured to provide an electronic indication of deformation of a portion of the sensor block in response to forces placed on the span block.

In another embodiment a sensor block includes a first portion positioned at a first end of the sensor block. The sensor block also includes a second portion positioned at a second end of the sensor block. Additionally, the sensor block includes a reactive section coupling the first portion to the second portion. The reactive section is configured to deform in response to force applied to the sensor block. The sensor block further includes a sensor component of the reactive section. The sensor is configured to output a signal indicative of deformation of the reactive section.

In a further embodiment a system includes a top drive configured to drive rotation of a tubular. The system also includes a span block positioned between the top drive and the tubular. The span block is configured to receive a load applied to the top drive by the tubular. Additionally, the system includes a plurality of sensor blocks positioned circumferentially about the span block. Each sensor block of the plurality of sensor blocks comprises a sensor configured to output a signal indicative of the load applied to the top drive via the span block. Moreover, the system includes a controller communicatively coupled to each sensor and configured to control operation of the top drive based on the signal indicative of the load applied to the top drive.

DRAWINGS

These and other features, aspects, and advantages of the presently disclosed embodiments will become better understood when the following detailed description is read with reference to the accompanying drawings in which like characters represent like parts throughout the drawings, wherein:

FIG. 4 is a top plan view of the sensor block of FIG. 3, in accordance with present techniques;

FIG. 5 is a side view of the sensor block of FIG. 4, in accordance with present techniques;

DETAILED DESCRIPTION

Present embodiments provide a span block positioned on a drill rig to measure a load applied to a top drive. In certain embodiments, the span block is configured to couple to the top drive and to tubular such that the span block receives the load of the tubular. The span block may include sensors positioned on sensor blocks to measure the strain applied by the tubular. As a result, the load applied to the top drive may be measured by the span block. In certain embodiments, the span block may include an array of sensor blocks positioned circumferentially about the tubular. In this manner, sensors positioned on the sensor blocks may determine the load applied to the top drive at different locations about the circumference of the top drive. Measuring the load at different circumferential locations may enable a control system communicatively coupled to the sensors to determine an orientation of the tubular with respect to an axis of the top drive, and therefore indicate whether the tubular is aligned or misaligned with the top drive. Accordingly, the control system may utilize feedback from the sensor to adjust operating parameters of the top drive during drilling operations.

Figure 1:
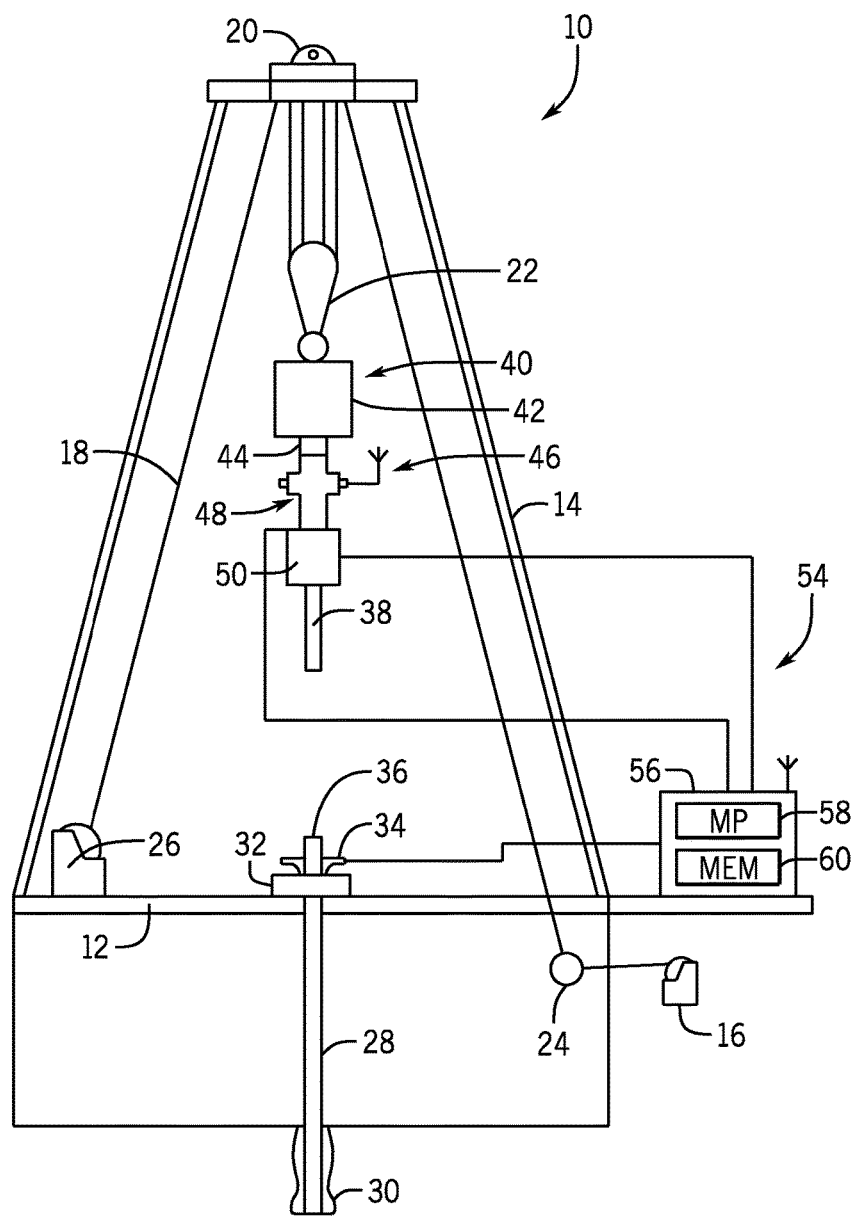
FIG. 1 is a schematic view of an embodiment of a well being drilled with a span block, in accordance with present techniques.

Turning now to the drawings, FIG. 1 is a schematic view of a drilling rig 10 in the process of drilling a well in accordance with present techniques. The drilling rig 10 features an elevated rig floor 12 and a derrick 14 extending above the rig floor 12. A supply reel 16 supplies drilling line 18 to a crown block 20 and traveling block 22 configured to hoist various types of drilling equipment above the rig floor 12. The drilling line 18 is secured to a deadline anchor 24, and a drawworks 26 regulates the amount of drilling line 18 in use and, consequently, the height of the traveling block 22 at a given moment. Below the rig floor 12, a drill string 28 extends downward into a wellbore 30 and is held stationary with respect to the rig floor 12 by a rotary table 32 and slips 34 (e.g., power slips). A portion of the drill string 28 extends above the rig floor 12, forming a stump 36 to which another length of tubular 38 (e.g., a joint of drill pipe, a section of casing) may be added.

A tubular drive system 40, hoisted by the traveling block 22, positions the tubular 38 above the wellbore 30. In the illustrated embodiment, the tubular drive system 40 includes a top drive 42, a quill 44 (e.g., a sub, a gripping device), and a torque turn system 46 (e.g., a wireless torque turn system, a tubular monitoring system) configured to monitor, control, and/or evaluate forces acting on the tubular drive system 40, such as torque, weight, and so forth. In the illustrated embodiment, the quill 44 extends from the top drive 42 toward the rig floor 12. The torque turn system 46 may measure forces acting on the tubular drive system 40 via a span block 48 (e.g., a sub). In certain embodiments, the span block 48 includes sensors, such as strain gauges, gyroscopes, pressure sensors, accelerometers, magnetic sensors, optical sensors, or other sensors, which may be communicatively linked or physically integrated with the torque turn system 46. Moreover, in certain embodiments, the span block 48 includes the torque turn system 46. As shown in the illustrated embodiment, the span block 48 (e.g., via the torque turn system 46) is coupled to the top drive 42 at a first end (e.g., via the quill 44) and to a casing drive system 50 (e.g., a tubular handling system) at a second end. Moreover, in certain embodiments, the torque turn system 46 may not be utilized and the span block 48 may be directly coupled between the quill 44 and the casing drive system 50 and/or the tubular 38. The tubular drive system 40, once coupled with the tubular 38, may then lower the coupled tubular 38 toward the stump 36 and rotate the tubular 38 such that it connects with the stump 36 and becomes part of the drill string 28.

The drilling rig 10 further includes a control system 54, which is configured to control the various systems and components of the drilling rig 10 that grip, lift, release, and support the tubular 38 and the drill string 28 during a casing running or tripping operation. For example, the control system 54 may control operation of the casing drive system 50 and the power slips 34 based on measured feedback (e.g., from the torque turn system 46, from the span block 48, from other sensors) to ensure that the tubular 38 and the drill string 28 are adequately gripped and supported by the casing drive system 50, the torque turn system 46, the tubular drive system 40 and/or the power slips 34 during a casing running operation. In this manner, the control system 54 may reduce and/or eliminate incidents where lengths of the tubular 38 and/or the drill string 28 are unsupported. Moreover, the control system 54 may control auxiliary equipment such as mud pumps, robotic pipe handlers, and the like.

In the illustrated embodiment, the control system 54 includes a controller 56 having one or more microprocessors 58 and a memory 60. For example, the controller 56 may be an automation controller, which may include a programmable logic controller (PLC). The memory 60 is a non-transitory (not merely a signal), tangible, computer-readable media, which may include executable instructions that may be executed by the microprocessor 56. The controller 56 receives feedback from the torque turn system 46 and/or other sensors (e.g., directly from sensors of the span block 48) that detect measured feedback associated with operation of the drilling rig 10. For example, the controller 56 may receive feedback from the tubular drive system 46 and/or other sensors via wired or wireless transmission. Based on the measured feedback, the controller 56 regulates operation of the tubular drive system 46 (e.g., rotation speed, downward pressure).

During operation, the traveling block 22 is configured to move up and down relative to the rig floor 12. For example, the traveling block 22 may move up to remove the tubular 38 from the drill string 28 and/or move down to add the tubular 38 to the drill string 28. As the tubulars 38 are added to and/or removed from the drill string 28, the traveling block 22, and as a result the top drive 42 are subjected to changing load conditions. For example, the tubular 38 may apply a load to the top drive 42, thereby changing operation of the top drive 42 to account for the increased load. Moreover, in certain embodiments, the tubular 38 may subject the top drive 42 to torque and/or rotational forces. For example, the tubular 38 may be misaligned with the stump 36, which may increase the difficulty of coupling the tubular 38 to the drill string 28. Accordingly, the span block 48 is configured to measure the strain and/or torque applied to the top drive 42, thereby enabling the control system 54 to adjust drilling operations to facilitate installation and/or removal of the tubulars 38.

It should be noted that the illustration of FIG. 1 is intentionally simplified to focus on the span block 48 of the drilling rig 10, which is described in greater detail below. Many other components and tools may be employed during the various periods of formation and preparation of the well. Similarly, as will be appreciated by those skilled in the art, the orientation and environment of the well may vary widely depending upon the location and situation of the formations of interest. For example, rather than a generally vertical bore, the well, in practice, may include one or more deviations, including angled and horizontal runs. Similarly, while shown as a surface (land-based) operation, the well may be formed in water of various depths, in which case the topside equipment may include an anchored or floating platform. Moreover, while the illustrated embodiment is directed toward the drilling rig 10, the span block 48 may be utilized in a variety of industries in which measuring strain and/or orientation between two mechanically coupled components may be desirable. While only certain features of the invention have been illustrated and described herein, many modifications and changes will occur to those skilled in the art. It is, therefore, to be understood that the appended claims are intended to cover all such modifications and changes as fall within the true spirit of the invention.

Figure 2:
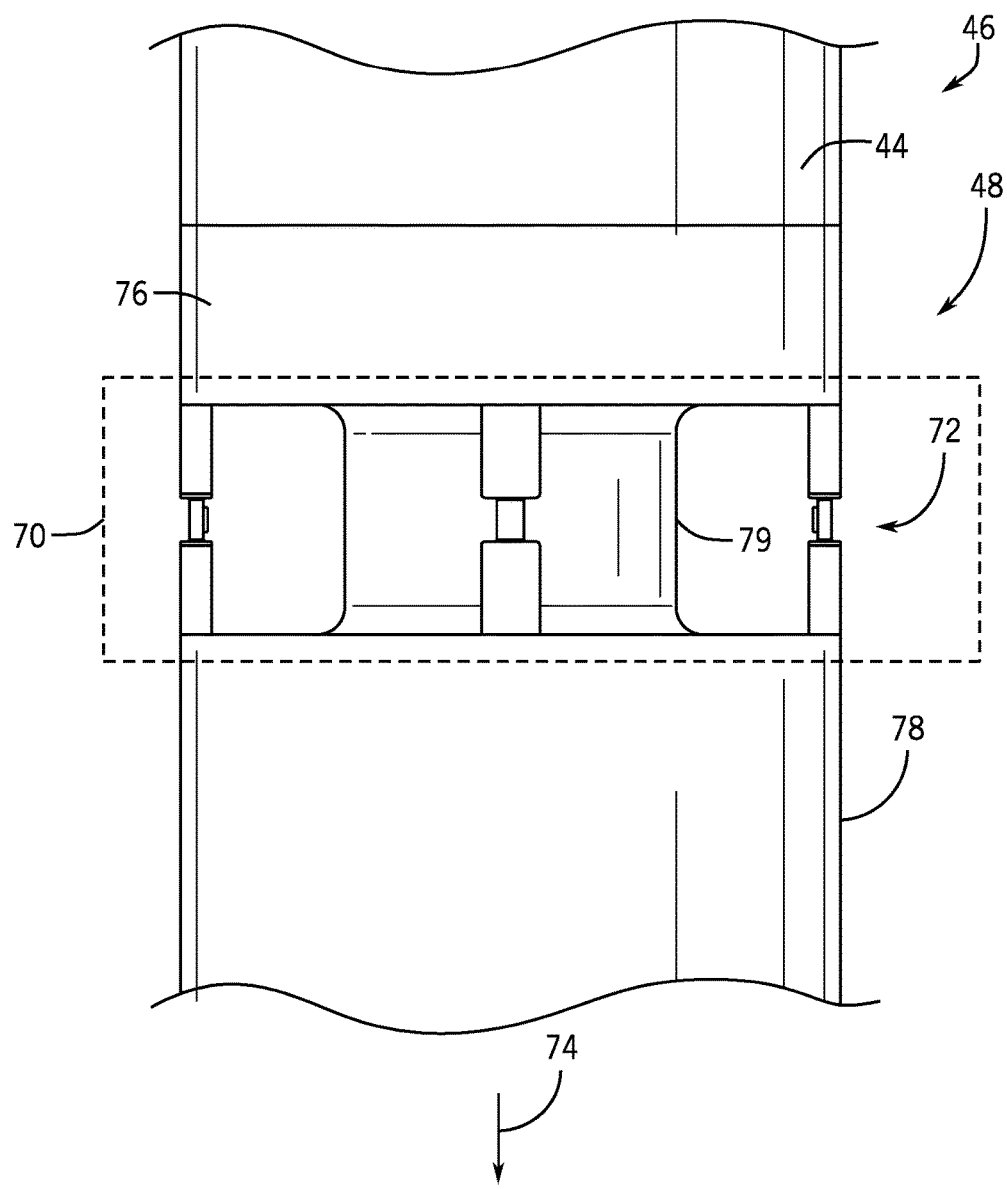
FIG. 2 is a schematic side view of the span block of FIG. 1 coupled to a top drive, in accordance with present techniques.

FIG. 2 is a schematic side view of an embodiment of the span block 48 positioned within the torque turn system 46 beneath the quill 44. As shown, the torque turn system 46 is coupled to the top drive 42 (e.g., via the quill 44) at a first portion while the torque turn system 46 is coupled to the tubular 38 at a second portion (not shown). Accordingly, the weight (e.g., downward force) of the tubular 38 is transferred to the span block 48 due to the attachment of the span block 48 to the torque turn system 46. For example, in the illustrated embodiment, the span block 48 is positioned with a housing 70 (shown in phantom for clarity) of the torque turn system 46. In certain embodiments, the housing 70 includes electronics and/or communication devices to facilitate communication between the span block 48 and the torque turn system 46 and/or the control system 54. By transferring the weight of the tubular 38 to the span block 48 (e.g., via the connection between the span block 48 and the torque turn system 46), sensor blocks 72 may measure a load 74 applied to the top drive 42. As used herein, the load 74 may refer to a force (e.g., weight) acting upon the top drive 42 and/or the span block 48 (e.g., the sensor blocks 72 of the span block 48) configured to induce deformation of the span block 48. As used herein, deformation refers to a change in shape of the span block 48 (e.g., the sensor blocks 72 of the span block 48). For example, in certain embodiments the span block 48 may elongate, compress, or twist. For example, the deformation may be due to strain in a direction parallel to the load 74. However, in other embodiments, the deformation may be due to a shearing force induced by the load 74. Accordingly, the load 74 may be due to the weight of the tubular 38 coupled to the top drive 42. As mentioned above, the sensor blocks 72 are configured to receive the load 74 acting on the top drive 42. For example, in the illustrated embodiment, the sensor blocks 72 are coupled across a narrowed sub section 79 between a top sub section 76 (e.g., a first end of the span block 48) and a bottom sub section 78 (e.g., a second end of the span block 48). Moreover, the sensor blocks 72 extend approximately the same distance as the narrowed sub section 79. It will be appreciated that the narrowed sub section 79 may be utilized to form a robust connection between the top sub section 76 and the bottom sub section 78. However, as will be described below, because the sensor blocks 72 have a smaller area and/or volume than the narrowed sub section 79, the mechanical strain across the sensor blocks 72 may be amplified as compared to evaluating the mechanical strain across the narrowed sub section 79. Moreover, it will be appreciated that the narrowed sub section 79 also receives the weight (e.g., downward force) of the tubular 38. In certain embodiments, the bottom sub section 78 may be coupled to the tubular 38 such that the load 74 is transferred to the sensor blocks 72. Additionally, in other embodiments, addition subs containing measurement tools, equipment, and the like may be positioned upstream or downstream of the span block 48. It will be appreciated that the configuration of the span block 48 may be modified to accommodate drilling operations such that the load 74 is distributed over the sensor blocks 72. For example, in the illustrated embodiment, the span block 48 is substantially cylindrical to facilitate coupling between the span block 48 and the top drive 42. However, in other embodiments, the span block 48 may be elliptical, polygonal, or the like.

In the illustrated embodiment, the span block 48 includes an array of sensor blocks 72. As shown, three sensor blocks 72 are distributed about the sub 76. However, in other embodiments, the span block 48 may include 1, 2, 4, 5, 6, 7, 8, 9, 10, or any suitable number of sensor blocks 72. For example, the span block 48 may include four sensor blocks 72 equally spaced about the circumference. However, in other embodiments, the sensor blocks 72 may not be equally spaced. For example, more sensor blocks 72 may be located on a side of the span block 48 in which larger loads are anticipated (e.g., due to additional equipment). By utilizing multiple sensor blocks 72, the span block 48 may be configured to measure both the downward force (e.g., strain, weight) applied to the top drive 42, the shear force (e.g., twisting) acting on the top drive 42, and/or the angular alignment of the tubular 38 relative to the stump 36. That is, the sensor blocks 72 may detect longitudinal deformation, axial deformation, and/or circumferential deformation to determine the load 74 applied to the span blocks 48, and therefore to the top drive 42.

Figure 3:
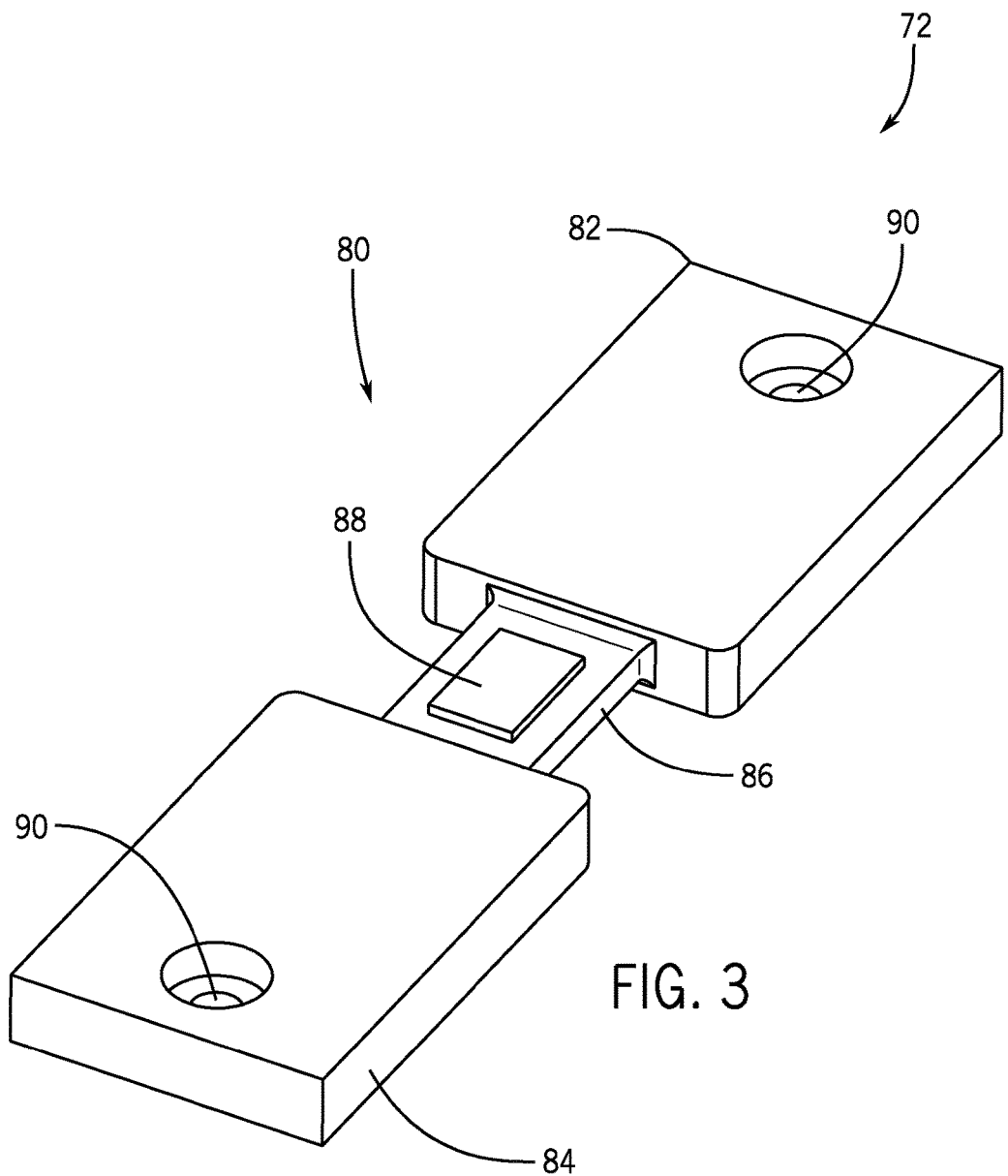
FIG. 3 is a perspective view of an embodiment of a sensor block having a sensor, in accordance with present techniques.

FIG. 3 is a schematic perspective view of an embodiment of the sensor block 72. As shown, the sensor block 72 includes a body 80 having a first portion 82 and a second portion 84 coupled together by a reactive section 86. In the illustrated embodiment, the reactive section 86 includes a sensor 88 configured to determine (e.g., provide an electronic indication) a deformation, deflection, or other change to the reactive section 86. For example, the sensor 88 may be a strain gauge (e.g., a foil strain gauge) having a resistance which increases or decreases while the strain gauge is under tension (e.g., longitudinal strain, longitudinal deformation). As a result, a measured voltage across the sensor 88 may decrease or increase to indicate the reactive section 86 is under tension. Moreover, the sensor 88 may be configured to detect torsional or rotational movements of the reactive section 86. For instance, the strain gauge may be mounted on the reactive section such that the resistance increases as a result of elongation due to twisting of the reactive section 86 (e.g., shear, axial deformation). However, in other embodiments, the sensor 88 may include, a piezoresistor, an optical fiber, a mechanical strain gauge, or the like.

In the illustrated embodiment, the sensor block 72 includes apertures 90 configured to couple the sensor block 72 to the top sub section 76 and to the bottom sub section 78 across the narrowed sub section 79. For example, the apertures 90 may receive fasteners (e.g., screws, bolts) to rigidly couple the sensor block 72 to the top and bottom sub sections 76, 78. Accordingly, attachment and removal of the sensor blocks 72 from the span block 48 may be faster and/or easier utilizing the apertures 90 than embodiments where the sensor 88 is directly coupled to the narrowed sub section 79. For example, if the sensor 88 is replaced an operator may install a new span block 72 by removing the fasteners from the apertures 90 and installing the fasteners in the new span block 72, as opposed to manually removing the sensor 88 from the narrowed sub section 79 and subsequently installing a new sensor 88 to the narrowed sub section 79. Because the span block 48 is configured to transmit the load 74 from the tubular to the sensor block 72, the load 74 acting on the top drive 42 also acts on the sensor blocks 72, thereby enabling the sensor blocks 72 to determine the load 74 applied to the top drive 42 via the sensors 88. As will be described below, the geometry of the sensor blocks 72 enables finer determinations of the stress applied to the top drive 42.

FIG. 4 is a top plan view of an embodiment of the sensor block 72. In the illustrated embodiment the first portion 82 has a first width 100 and the second portion 84 has a second width 102. While the first and second widths 100, 102 are substantially equal in the illustrated embodiment, in other embodiments the first and second widths 100, 102 may be different. For example, the first width 100 may be larger than the second width 102, or vice versa. As used herein, substantially refers to within plus or minus 10 percent. However, as shown in the illustrated embodiment, a third width 104 of the reactive section 86 is less than each of the first and second widths 100, 102. For example, in the illustrated embodiment, the third width 104 is approximately one-half the first or second width 100, 102. However, in other embodiments, the third width 104 may be approximately one-fourth the first or second width 100, 102, approximately one-third the first or second width 100, 102, approximately two-thirds the first or second width 100, 102, approximately three-fourths the first or second width 100, 102, or any other suitable ratio of the first or second width 100, 102. As used herein, approximately refers to within plus or minus 15 percent.

Furthermore, the first portion 82 has a first length 106 and the second portion 84 has a second length 108. In the illustrated embodiment, the first and second lengths 106, 108 are substantially equal. However, in other embodiments, the first and second lengths 106, 108 may be different. Moreover, the reactive section 86 has a third length 110 that is smaller than each of the first and second lengths 106, 108. For example, in the illustrated embodiment, the third length 110 is approximately one-half the first or second length 106, 108. However, in other embodiments, the third length 110 may be approximately one-fourth the first or second length 106, 108, approximately one-third the first or second length 106, 108, approximately two-thirds the first or second length 106, 108, approximately three-fourths the first or second length 106, 108, or any other suitable ratio of the first or second length 106, 108. Accordingly, the reactive section 86 has a smaller surface area than the first or second portion 82, 84 due to the smaller third width 104 and third length 110.

As will be described below, the smaller surface area of the reactive section 86 enables improved assembly and measurement precision.

In the illustrated embodiment, the reactive section 86 includes curved end portions 112 at the interface coupling the reactive section 86 to the first and second portions 82, 84. The curved end portions 112 distribute the force applied to the reactive section 86 over a longer length than a substantially straight connection, thereby reducing a potential stress point at the interface between the reactive section 86 and the first and second portions 82, 84. In other embodiments, the curved end portions 112 may be substantially straight (e.g., perpendicular to the third width 104). Moreover, in further embodiments, the curved end portions 112 may be positioned at an angle relative to the third width 104. Accordingly, the reactive section 86 may be coupled to the first and second portions 82, 84 in a variety of ways to accommodate operating conditions. For example, in certain embodiments, the sensor block 72 is formed from a single piece of material (e.g., steel). However, in other embodiments, the reactive section 86 may be welded, or otherwise attached, to the first and second portions 82, 84.

The sensor 88 is mounted to the reactive section 86 to measure deflections and/or deformations due to loads applied to the sensor block 72. In the illustrated embodiment, an adhesive may be utilized to bond the sensor 88 to the reactive section 86. For example, a heat-activated adhesive may bond the sensor 88 to the reactive section 86 by heating the reactive section 86 to a desired temperature for a specified period of time. Because the reactive section 86 has a smaller surface area and/or volume than the first and second portions 82, 84, as well as the narrowed sub section 79, attachment of the sensor 88 may be accomplished faster due to the decreased time to heat the area. For example, the smaller surface area and/or volume may heat up to the desired temperature faster than the larger surface area and/or volume of the first and second portions 82, 84 and the narrowed sub section 79. Moreover, directing the heat over the smaller surface area may be easier, thereby decreasing the cost of manufacturing the span block 72. For example, the sensor 88 may be mounted to the sensor block 72, and the sensor block 72 may be positioned within an oven to cure (e.g., the epoxy coupling the sensor 88 to the sensor block 72). Because the sensor block 72 is smaller than other components (e.g., the narrowed sub section 79), a smaller oven may be utilized to couple the sensor 88 to the block 72. Moreover, as mentioned above, the smaller volume of the sensor block 72 may be heated faster (e.g., in the oven, in the field) than a larger volume (e.g., a volume of the narrowed sub section 79). As a result, the sensor block 72 may be more efficiently manufactured.

FIG. 5 is a side view of an embodiment of the sensor block 72. In the illustrated embodiment, the first portion 82 has a first thickness 114 and the second portion 84 has a second thickness 116. Moreover, the reactive section 86 has a third thickness 118. In the illustrated embodiment, the first and second thicknesses 114, 116 are substantially equal. However, in other embodiments, the first and second thicknesses 114, 116 may be different. Moreover, the third thickness 118 is smaller than each of the first and second thicknesses 114, 116. For example, in the illustrated embodiment, the third thickness 118 is approximately one-half the first or second thickness 114, 116. However, in other embodiments, the third thickness 118 may be approximately one-fourth the first or second thickness 114, 116, approximately one-third the first or second thickness 114, 116, approximately two-thirds the first or second thickness 114, 116, approximately three-fourths the first or second thickness 114, 116, or any other suitable ratio of the first or second thickness 114, 116. Accordingly, the reactive section 86 has a smaller volume than the first and second portions 82, 84 due to the smaller third width 104, third length 110, and third thickness 118.

Figure 6:
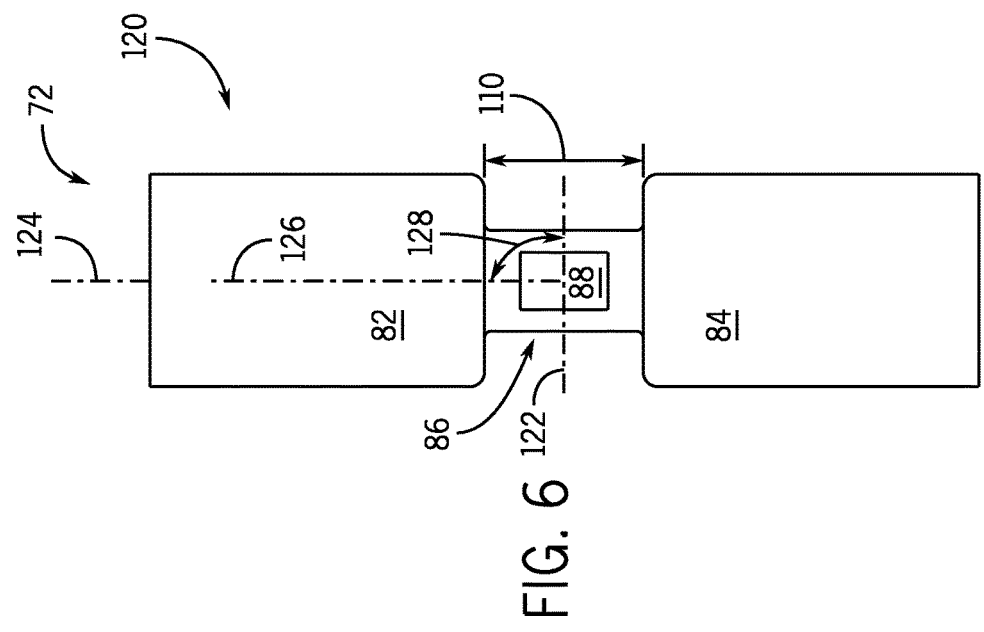
FIG. 6 is a top view of the sensor block of FIG. 3, in which the sensor block is in an unloaded configuration, in accordance with present techniques.

FIG. 6 is a schematic top view of an embodiment of the sensor 88 positioned on the sensor block 72 while the sensor block 72 is in an unloaded configuration 120. As used herein, the unloaded configuration 120 refers to a position in which the load 74 applied to the sensor block 72 is insufficient to distort and/or deform the sensor block 72. For example, the sensor block 72 may be in the unloaded configuration 120 while the tubular 38 is engaged with the stump 36 because the stump 36 may receive the load applied by the tubular 38 instead of the sensor block 72. As a result, the sensor 88 may relay a signal to the controller 56 indicative of the sensor block 72 being in the unloaded configuration 120. Accordingly, the controller 56 may instruct the top drive 42 to change operating parameters based on the signal received from the sensor 88.

While in the unloaded configuration 120, the reactive section 86 has the third width 104, the third length 110, and the third thickness 118. That is, the reactive section 86 is substantially unchanged due to the load 74. However, as will be described below, the reactive section 86 may deform due to the load 74 while the load 74 is sufficient to induce deformation and/or bending of the sensor blocks 72. In certain embodiments, the sensor 88 is configured to determine a torsional and/or twisting load applied to the sensor block 72. For example, the tubular 38 may transmit a torsional load due to misalignment between the tubular 38 and the stump 36. In the illustrated embodiment, the sensor 88 is dissected by a lateral axis 122 of the sensor block 72. In other words, the lateral axis 122 is substantially perpendicular to a longitudinal axis 124 of the top drive 42, which is substantially parallel to a longitudinal axis 126 of the sensor block 72. Accordingly, torsional forces may be measured in terms of an angle 128 between the lateral axis 122 and the longitudinal axis 126 of the sensor block 72. For example, while the angle 128 is substantially equal to 90 degrees, the load 74 may be substantially parallel to the longitudinal axis 126. However, in other embodiments, the angle 128 may be acute or obtuse, thereby indicating the load 74 may not be parallel to the longitudinal axis 126.

Figure 7:
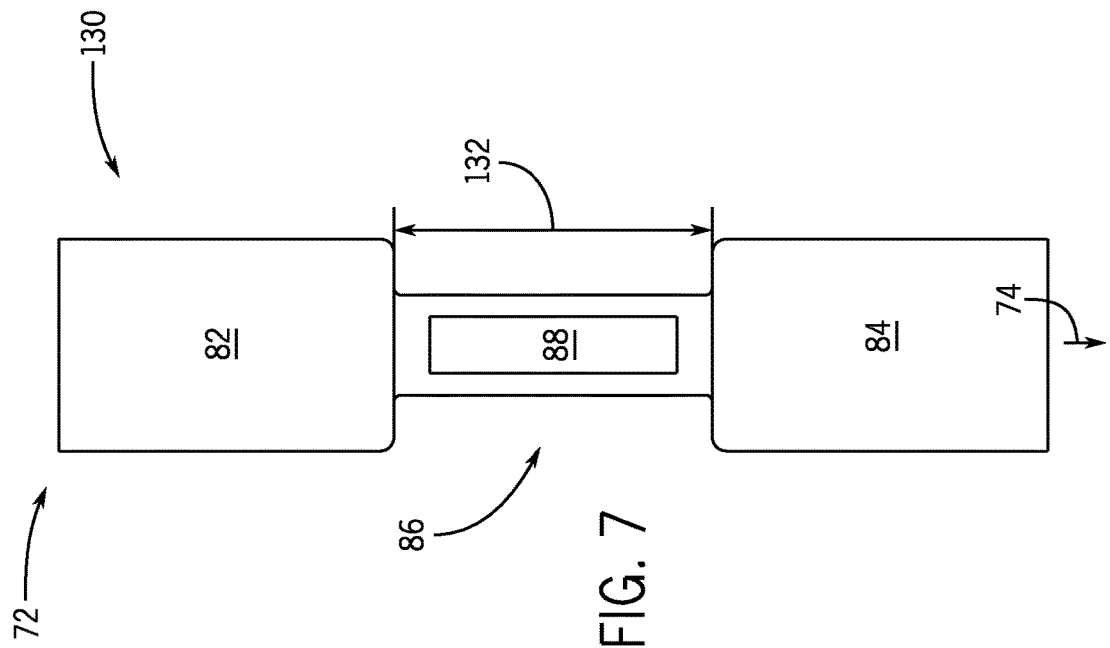
FIG. 7 is a top view of the sensor block of FIG. 3, in which the sensor block is in a loaded configuration, in accordance with present techniques.

FIG. 7 is a schematic top view of the sensor block 72 in a loaded orientation 130. As used herein, the loaded orientation 130 refers to a condition in which the load 74 is sufficient to induce deformation of the sensor block 72. For example, the span block 48 may be coupled to the tubular 38, thereby applying a load to the sensor block 72 and elongation of the reactive section 86. As mentioned above, the reactive section 86 has a smaller surface area and a smaller volume than the first portion 82 and the second portion 84. In other words, a cross-sectional area of the reactive section 86 in the direction of the load 74 is smaller than a cross-sectional area of the first and second portions 82, 84. Accordingly, the reactive section 86 may be more susceptible to deformation than the first and second portions 82, 84. As shown in the illustrated embodiment, the reactive section 86 includes a deformation length 132 that is longer than the third length 110 while in the loaded orientation 130. It should be noted that the deformation to the reactive section 86 illustrated in FIG. 7 may be exaggerated for clarity. For example, in certain embodiments, the reactive section 86 may be configured to elongate by a certain percentage of the third length 110 (e.g., ten percent, twenty percent, thirty percent). Moreover, the elongation of the reactive section 86 may vary based on the type of sensor 88 utilized by the sensor block 72. Accordingly, deformation due to the load 74 applied by the tubular 38 deforms the reactive section 86, thereby elongating the sensor 88 and producing a signal indicative of the load 74 on the sensor block 72. However, in other embodiments, the deformation length 132 may be smaller than the third length 110. For example, compression of the reactive section 86 may decrease the length of the deformation length 132.

As mentioned above, the reactive section 86 is configured to deform in response to the load 74. However, in certain embodiments, the first portion 82 and/or the section portion 84 may also deform in response to the load 74. The sensor block 72 may be formed from materials having particularly selected properties to enable elastic deformation while the sensor block 72 is in the loaded configuration 130. However, the material properties may be particularly selected to block or prevent plastic deformation while the sensor block 72 in the loaded configuration 130. As a result, the reactive section 86 may return or substantially return to the third length 110 after the load 74 is removed from the sensor block 72. Accordingly, the sensor block 72 may be reused across multiple loaded and unloaded configurations 130, 120.

It will be appreciated that the sensor blocks 72 focus the load 74 over a smaller area than embodiments in which the sensors 88 are positioned on the tubular 38 or the sub 76. As a result, more deformation may occur over the reactive section 86. In embodiments where the sensor 88 is a strain gauge, a larger range of the gauge may be utilized by directing the load 74 across the reactive section 86. In other words, the reactive section 86 will deform more than the sub 76 and/or the tubular 38 due to the cross-sectional area. As a result, a larger amount of deformation may be detected by the strain gauge, enabling a larger range of the gauge to be utilized. Moreover, because of the smaller cross-sectional area, the reactive section 86 may deform with a smaller load 74 than the narrowed sub section 79 of the span block 48. As a result, the sensor 88 may detect smaller loads 74 than if the sensor 88 were positioned on the narrowed sub section 79.

As mentioned above, in certain embodiments, an array of sensor blocks 72 may be disposed about the circumference of the span block 48. Thereafter, the force applied by the tubular 38 may be distributed over the array of sensor blocks 72. Positioning the sensor blocks 72 about the circumference may enable detection of misalignment of the tubular 38. For example, the sensor blocks 72 of the array may have different deformation lengths 132, indicating a larger force is being applied to certain sensor blocks 72 of the array. Accordingly, sensor blocks 72 may be utilized to determine misalignment of the tubular 38 even if the sensors 88 are configured to detect stress in a single direction parallel to the longitudinal axis 126.

As described in detail above, the span block 48 is configured to direct the load 74 acting on the top drive 42 across the sensor blocks 72. As a result, the sensor blocks 72 may deform to determine the load 74 acting on the top drive 42, thereby enabling the controller 56 to adjust operation of the top drive 42. As described above, the sensor block 72 includes the reactive section 86 having a smaller cross-sectional area than the adjacent first and second portions 82, 84. Accordingly, the load 74 may be directed over the reactive section 86. In certain embodiments, the reactive section 86 includes the sensor 88 configured to detect the deformation of the reactive section 86 and output a signal to the control system 54. For example, the sensor 88 may be a strain gauge that outputs a signal indicative of tension applied to the reactive section 86. Additionally, in other embodiments, the span block 48 may include an array of sensor blocks 72 to enable detection of the alignment and/or torsional loads on the top drive 42.

While only certain features of disclosed embodiments have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:
a sub configured to couple with an extension from a top drive at a first end region of the sub and configured to couple to a tubular at a second end region of the sub;
a narrowed sub-section of the sub disposed between and extending continuously between the first and second end regions, wherein the narrowed sub-section is directly and integrally formed with both the first and second end regions at the narrowed sub-section; and
a plurality of sensor blocks extending between the first end region and the second end region of the sub, wherein each sensor block of the plurality of sensor blocks is configured to provide an electronic indication of deformation of a portion of the sensor block in response to torsional forces placed on the sub, wherein the plurality of sensor blocks is positioned circumferentially about the narrowed subsection of the sub, wherein the plurality of sensor blocks is spaced a distance from the narrowed sub-section, and wherein each sensor block of the plurality of sensor blocks is coupled directly to the sub, and wherein each sensor block of the plurality of sensor blocks comprises:
a first portion at a first end of the sensor block;
a second portion at a second end of the sensor block; and
a reactive section positioned between the first portion and the second portion, wherein the reactive section is configured to couple the first portion to the second portion, and wherein the reactive section has a smaller width, a smaller thickness, and a smaller length as compared to widths, thicknesses, and lengths of each of the first and second portions.

2. The system of claim 1, wherein the reactive section comprises the reactive section length while in an unloaded configuration and a deformation length while in a loaded configuration, wherein the deformation length is larger than the reactive section length.

3. The system of claim 1, wherein each sensor block of the plurality of sensor blocks comprises a foil strain gauge configured to provide the electronic indication by outputting a signal indicative of a load applied to the sensor block.

4. The system of claim 3, comprising a controller configured to receive the signal from the foil strain gauge indicative of the load applied to each sensor block of the plurality of sensor blocks.

5. The system of claim 1, wherein each sensor block of the plurality of sensor blocks comprises a foil strain gauge, a piezoresistor, an optical fiber, a mechanical strain gauge, or a combination thereof.

6. The system of claim 1, comprising a tubular and a top drive configured to drive rotation of the tubular, wherein a quill of the top drive is coupled with the first end region of the sub and the tubular is coupled with the second end region of the sub.

7. The system of claim 1, wherein each sensor block of the plurality of sensor blocks is rigidly coupled to the sub.

8. An oilfield sub, comprising:
a first end region;
a second end region;
a narrowed sub-section disposed between the first and second end regions, wherein the narrowed sub-section extends continuously between and is directly and integrally formed with both the first and second end regions;
a sensor block, comprising:
   a first portion positioned at a first end of the sensor block;
   a second portion positioned at a second end of the sensor block;
   a reactive section rigidly coupling the first portion to the second portion, wherein the reactive section is configured to deform in response to torsional and longitudinal forces applied to the sensor block, and wherein the reactive section has a smaller width, a smaller thickness, and a smaller length as compared to widths, thicknesses, and lengths of each of the first and second portions; and
   a sensor component of the reactive section, wherein the sensor component is configured to output a signal indicative of deformation of the reactive section, and wherein the sensor block is configured to be coupled directly to the oilfield sub; and
a control system configured to utilize the signal indicative of deformation to adjust rotational speed of the top drive.

9. The oilfield sub of claim 8, wherein the reactive section comprises curved end portions at a first interface between the first portion and the reactive section and at a second interface between the second portion and the reactive section.

10. The oilfield sub of claim 8, wherein the sensor component comprises a foil strain gauge, a piezoresistor, an optical fiber, a mechanical strain gauge, or a combination thereof.

11. The oilfield sub of claim 8, wherein the sensor component comprises a foil strain gauge.

12. The oilfield sub of claim 8, wherein the reactive section is equidistant from the first and second end regions.

13. A system, comprising,
a top drive configured to drive rotation of a tubular;
a sub positioned between the top drive and the tubular, wherein the sub is configured to receive a load applied to the top drive by the tubular;
a plurality of sensor blocks positioned circumferentially about the sub, wherein the plurality of sensor blocks is spaced a distance from a narrowed shaft portion of the sub, wherein the narrowed shaft portion is directly and integrally formed with and extends continuously between both a first end region of the sub and a second end region of the sub; wherein each sensor block of the plurality of sensor blocks is configured to deform in response to a torsional force of the load applied to the top drive by the tubular, and each sensor block of the plurality of sensor blocks comprises a sensor configured to output a signal indicative of the torsional force of the load applied to the top drive by the tubular, wherein each sensor block of the plurality of sensor blocks is coupled directly to the sub, wherein each sensor block of the plurality of sensor blocks comprises:
   a first portion at a first end of the sensor block;
   a second portion at a second end of the sensor block; and
   a reactive section positioned between the first portion and the second portion,
      wherein the reactive section is configured to couple the first portion to the second portion, and wherein the reactive section has a smaller width, a smaller thickness, and a smaller length as compared to widths, thicknesses, and lengths of each of the first and second portions; and
a controller communicatively coupled to each sensor and configured to control operation of the top drive based on the signal indicative of the load applied to the top drive.

14. The system of claim 13, wherein the reactive section is configured to deform in response to the torsional force applied to the top drive by the tubular.

15. The system of claim 14, wherein the reactive section comprises a third length while each of the plurality of sensor blocks is in an unloaded position, in which the load is insufficient to deform the reactive section, and the reactive section comprises a deformation length while in the loaded position, the deformation length being longer than the third length.

16. The system of claim 13, wherein the plurality of sensor blocks are equally distributed about a circumference of the sub.

17. The system of claim 14, wherein the reactive sections of each sensor block of the plurality of sensor blocks is configured to individually deform such that a signal indicative of misalignment of the tubular is sent to the controller.

* * * * *